United States Patent
Sun et al.

(10) Patent No.: US 12,363,033 B2
(45) Date of Patent: Jul. 15, 2025

(54) METHOD FOR CONFIGURING MEDIA ACCESS CONTROL ADDRESS AGING TIME AND APPARATUS

(71) Applicant: Huawei Technologies Co., Ltd., Shenzhen (CN)

(72) Inventors: Chunxia Sun, Beijing (CN); Yaokun Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 447 days.

(21) Appl. No.: 17/830,999

(22) Filed: Jun. 2, 2022

(65) Prior Publication Data

US 2022/0294734 A1    Sep. 15, 2022

Related U.S. Application Data

(63) Continuation of application No. PCT/CN2020/134005, filed on Dec. 4, 2020.

(30) Foreign Application Priority Data

Dec. 6, 2019  (CN) .......................... 201911239038.3

(51) Int. Cl.
| | |
|---|---|
| *H04L 41/0895* | (2022.01) |
| *H04L 12/46* | (2006.01) |
| *H04L 41/0806* | (2022.01) |
| *H04L 41/0813* | (2022.01) |
| *H04L 45/00* | (2022.01) |

(Continued)

(52) U.S. Cl.
CPC .......... *H04L 45/66* (2013.01); *H04L 12/4633* (2013.01); *H04L 41/0895* (2022.05); *H04L 45/52* (2013.01); *H04L 45/745* (2013.01); *H04L 69/324* (2013.01)

(58) Field of Classification Search
None
See application file for complete search history.

(56) References Cited

U.S. PATENT DOCUMENTS

| | | | | |
|---|---|---|---|---|
| 5,633,858 | A | * | 5/1997 | Chang et al. ......... H04L 45/745 |
| 6,343,330 | B1 | * | 1/2002 | Khanna et al. ......... H04L 45/34 |

(Continued)

FOREIGN PATENT DOCUMENTS

| | | |
|---|---|---|
| CN | 1992672 A | 7/2007 |
| CN | 102821168 A | 12/2012 |

(Continued)

OTHER PUBLICATIONS

RFC 4271: BGP-4 (Year: 2006).*

(Continued)

*Primary Examiner* — Gregory B Sefcheck
*Assistant Examiner* — Benjamin Peter Welte
(74) *Attorney, Agent, or Firm* — Conley Rose, P.C.

(57) ABSTRACT

In a method for configuring a MAC address aging time, a first device generates a first Ethernet virtual private network EVPN protocol packet. The first EVPN protocol packet includes aging time information indicating a media access control (MAC) address aging time for an EVPN. The first device sends the first EVPN protocol packet to a second device. The second device configures the MAC address aging time based on the first EVPN protocol packet.

20 Claims, 5 Drawing Sheets

(51) Int. Cl.
  *H04L 45/52* (2022.01)
  *H04L 45/745* (2022.01)
  *H04L 61/103* (2022.01)
  *H04L 61/58* (2022.01)
  *H04L 69/324* (2022.01)

(56) References Cited

U.S. PATENT DOCUMENTS

| | | | |
|---|---|---|---|
| 9,019,973 B1* | 4/2015 | Shukla et al. | H04L 45/66 |
| 9,391,885 B1 | 7/2016 | Shukla et al. | |
| 10,313,152 B2* | 6/2019 | Nainar et al. | H04L 12/4633 |
| 10,313,153 B2 | 6/2019 | Nainar et al. | |
| 10,958,554 B2* | 3/2021 | Nandy et al. | H04L 43/20 |
| 2014/0052876 A1 | 2/2014 | Zeng et al. | |
| 2016/0285761 A1* | 9/2016 | Dong et al. | H04L 12/4666 |
| 2017/0373973 A1 | 12/2017 | Bickhart et al. | |
| 2020/0076921 A1* | 3/2020 | Hwang | H04L 45/745 |

FOREIGN PATENT DOCUMENTS

| | | |
|---|---|---|
| CN | 103259726 A | 8/2013 |
| CN | 105790996 A | 7/2016 |
| CN | 109218178 A | 1/2019 |
| CN | 109218456 A | 1/2019 |
| CN | 109842694 A | 6/2019 |

OTHER PUBLICATIONS

Sajassi A et al., "BGP MPLS-Based Ethernet VPN," RFC 7432, Feb. 18, 2015, XP015104549, 56 pages.

Sangli A et al., "BGP Extended Communities Attribute," RFC 4360, Feb. 1, 2006, XP015044793, 12 pages.

* cited by examiner

| S801. Receive a packet #2, where the packet #2 includes information A used to indicate MAC address aging time |
|---|
| S802. Configure the MAC address aging time based on the information A |

METHOD FOR CONFIGURING MEDIA ACCESS CONTROL ADDRESS AGING TIME AND APPARATUS

CROSS-REFERENCE TO RELATED APPLICATIONS

This application is a continuation of International Patent Application No. PCT/CN2020/134005, filed on Dec. 4, 2020, which claims priority to Chinese Patent Application No. 201911239038.3, filed on Dec. 6, 2019. The disclosures of the aforementioned applications are hereby incorporated by reference in their entireties.

TECHNICAL FIELD

This application relates to the communications field, and more specifically, to a method for configuring media access control address aging time and an apparatus.

BACKGROUND

In a router network, media access control (MAC) address aging time of a layer-2 network device is usually less than Address Resolution Protocol (ARP) entry aging time of a layer-3 gateway device. To avoid a case in which an unknown unicast packet is sent in a broadcast form because the MAC address aging time is less than the ARP entry aging time, in the conventional technology, the MAC address aging time of the layer-2 network device is manually adjusted. However, there may be thousands of edge devices in an existing layer-2 network, resulting in a heavy configuration workload.

SUMMARY

This present disclosure provides a method for configuring MAC address aging time and an apparatus to simplify network deployment.

According to a first aspect, the present disclosure provides a method for configuring MAC address aging time. The method includes a first device generates a first Ethernet virtual private network (EVPN) protocol packet, where the first EVPN protocol packet includes aging time information indicating a MAC address aging time for an EVPN; and the first device sends the first EVPN protocol packet to a second device.

According to the foregoing solution, one device in the EVPN sends a packet, so that another device in the EVPN modifies a MAC address aging time based on the packet. This simplifies the network deployment by using a full-mesh feature of the device in the EVPN.

With reference to the first aspect, in some implementations of the first aspect, the first EVPN protocol packet lacks route information for generating a forwarding entry.

With reference to the first aspect, in some implementations of the first aspect, the second device is a border gateway protocol BGP neighbor device of the first device.

According to the foregoing solution, a packet for transmitting MAC address aging time is for configuring the MAC address aging time of devices that establish BGP neighbor relationships in a network, and is not used to guide packet forwarding. Therefore, there is no need to carry route information to reduce overheads.

With reference to the first aspect, in some implementations of the first aspect, a route type of the first EVPN protocol packet indicates that the first EVPN protocol packet is a packet for configuring the MAC address aging time.

According to the foregoing solution, the MAC address aging time is transmitted by using a dedicated route type for configuring the MAC address aging time. This avoids a case in which the MAC address aging time is repeatedly configured by transmitting other information.

With reference to the first aspect, in some implementations of the first aspect, a route type of the first EVPN protocol packet is a MAC/Internet Protocol (IP) route type, and the aging time information is carried in an extended community attribute field of the first EVPN protocol packet.

A packet format of an existing route type is reused to transmit the MAC address aging time, so that complexity of a packet format design is reduced.

With reference to the first aspect, in some implementations of the first aspect, the first device is a layer-2 network egress provider edge (PE) device.

According to the foregoing solution, a PE device at an egress from a layer-2 network to a layer-3 network is a key maintenance device maintained by an administrator. The MAC address aging time is manually modified on the device to facilitate maintenance of the administrator.

According to a second aspect, the present disclosure provides a method for configuring MAC address aging time. The method includes a second device receives a second Ethernet virtual private network EVPN protocol packet sent by a first device, where the second EVPN protocol packet includes aging time information indicating aging time of a media access control MAC address for an EVPN; and the second device configures the MAC address aging time based on the aging time information.

According to the foregoing solution, one device in the EVPN sends a packet, so that another device in the EVPN modifies MAC address aging time based on the packet. This simplifies the network deployment by using a full-mesh feature of the device in the EVPN.

With reference to the second aspect, in some implementations of the second aspect, the second EVPN protocol packet lacks route information for generating a forwarding entry.

With reference to the second aspect, in some implementations of the second aspect, the second device is a Border Gateway Protocol (BGP) neighbor device of the first device.

According to the foregoing solution, a packet for transmitting MAC address aging time is for configuring the MAC address aging time of a device that establishes a BGP neighbor relationship in a network, and is not used to guide packet forwarding. Therefore, there is no need to carry route information to reduce overheads. With reference to the second aspect, in some implementations of the second aspect, the aging time information is a first value of the MAC address aging time, and that the second device configures the MAC address aging time based on the aging time information includes: The second device configures the first value as the MAC address aging time, or the second device uses the larger one of the first value and a second value of a locally configured MAC address aging time as the MAC address aging time.

With reference to the second aspect, in some implementations of the second aspect, a value of a MAC address aging time modified by the second device is greater than a value of an ARP entry aging time of a gateway device in a layer-3 network.

According to the foregoing solution, one device in the EVPN sends a packet, so that another device in the EVPN modifies MAC address aging time based on the packet, thereby effectively avoiding sending of an unknown unicast packet in a broadcast form, port congestion, and excessively high central processing unit (CPU)usage that are caused because the MAC address aging time is less than the ARP entry aging time, and simplifying network deployment.

With reference to the second aspect, in some implementations of the second aspect, a route type of the second EVPN protocol packet indicates that the second EVPN protocol packet is a packet for configuring the MAC address aging time.

According to the foregoing solution, the MAC address aging time is transmitted by using a dedicated route type for configuring the MAC address aging time. This avoids a case in which the MAC address aging time is repeatedly configured by transmitting other information.

With reference to the second aspect, in some implementations of the second aspect, a route type of the second EVPN protocol packet is a MAC/IP route type, and the aging time information is carried in an extended community attribute field of the second EVPN protocol packet.

A packet format of an existing route type is reused to transmit the MAC address aging time, so that complexity of a packet format design is reduced.

According to a second aspect, the present disclosure provides a communications apparatus. The apparatus is applied in a first device and includes a processing module configured to generate a first Ethernet virtual private network EVPN protocol packet, where the first EVPN protocol packet includes aging time information indicating a MAC address aging time for an EVPN; and a sending module configured to send the first EVPN protocol packet to a second device.

With reference to the second aspect, in some implementations of the second aspect, the first EVPN protocol packet lacks route information for generating a forwarding entry.

With reference to the second aspect, in some implementations of the second aspect, a route type of the first EVPN protocol packet indicates that the first EVPN protocol packet is a packet for configuring the MAC address aging time.

With reference to the second aspect, in some implementations of the second aspect, a route type of the first EVPN protocol packet is a MAC/IP route type, and the aging time information is carried in an extended community attribute field of the first EVPN protocol packet.

With reference to the second aspect, in some implementations of the second aspect, the second device is a border gateway protocol BGP neighbor device of the first device.

With reference to the second aspect, in some implementations of the second aspect, the first device is a layer-2 network egress PE device.

According to a first aspect, the present disclosure provides a communications apparatus. The apparatus is applied in a second device and includes a receiving module configured to receive a second Ethernet virtual private network EVPN protocol packet sent by a first device, where the second EVPN protocol packet is a BGP packet, and the second EVPN protocol packet includes aging time information indicating a MAC address aging time for an EVPN; and a processing module configured to configure the MAC address aging time based on the aging time information.

With reference to the first aspect, in some implementations of the first aspect, the second EVPN protocol packet lacks route information for generating a forwarding entry.

With reference to the first aspect, in some implementations of the first aspect, the aging time information is a first value of the MAC address aging time; and the processing module is further configured to configure the first value as the MAC address aging time, or the processing module is further configured to use the larger one of the first value and a second value of a locally configured MAC address aging time as the MAC address aging time.

With reference to the first aspect, in some implementations of the first aspect, a route type of the second EVPN protocol packet indicates that the second EVPN protocol packet is a packet for configuring the MAC address aging time.

With reference to the first aspect, in some implementations of the first aspect, a route type of the second EVPN protocol packet is a MAC/IP route type, and the aging time information is carried in an extended community attribute field of the second EVPN protocol packet.

With reference to the first aspect, in some implementations of the first aspect, the second device is a BGP neighbor device of the first device.

According to a fifth aspect, the present disclosure provides a chip, including a processor and a transceiver, configured to perform the method according to any one of the first aspect or the implementations of the first aspect, or configured to perform the method according to any one of the second aspect or the implementations of the second aspect.

According to a sixth aspect, the present disclosure provides a network device, including a processor and a transceiver, configured to perform the method according to any one of the first aspect or the implementations of the first aspect, or configured to perform the method according to any one of the second aspect or the implementations of the second aspect.

According to a seventh aspect, the present disclosure provides a computer-readable storage medium including instructions. When the instructions are run on a network device, the network device is enabled to perform the method according to any one of the first aspect or the implementations of the first aspect, or the network device is enabled to perform the method according to any one of the second aspect or the implementations of the second aspect.

According to an eighth aspect, the present disclosure provides a computer program product. When the computer program product runs on a network device, the network device is enabled to perform the method according to any one of the first aspect or the implementations of the first aspect, or the network device is enabled to perform the method according to any one of the second aspect or the implementations of the second aspect.

According to a ninth aspect, the present disclosure provides a network system. The system includes a network device according to any one of the first aspect, the second aspect, or the implementations of the first aspect or the second aspect.

DESCRIPTION OF EMBODIMENTS

The following describes technical solutions of the present disclosure with reference to the accompanying drawings.

Figure 1:
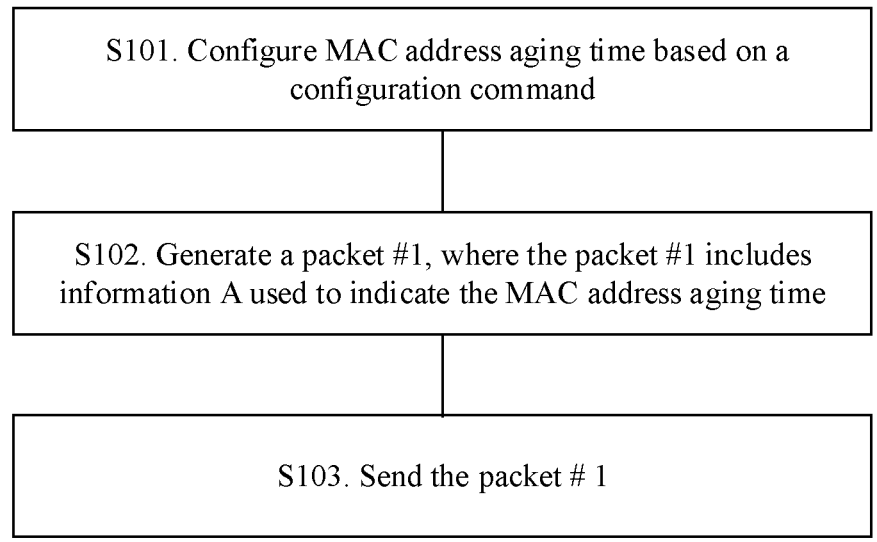
FIG. 1 is a schematic flowchart of a method for configuring a MAC address aging time according to an embodiment of the present disclosure.

FIG. 1 is a schematic flowchart of a method for configuring a MAC address aging time according to an embodiment of the present disclosure. The method in FIG. 1 is performed by a device A (that is, an example of a first device).

S101. Configure MAC address aging time based on a configuration command.

S102. Generate a packet #1, where the packet #1 is an EVPN protocol packet, that is, one of BGP packets. The packet #1 includes information A indicating aging time of a MAC address for an EVPN, and the information A may also be referred to as aging time information.

S103. Send the packet #1.

After the MAC address aging time of the device A in the EVPN is reconfigured to a value K, the device A generates the packet #1 based on the value K, where the packet #1 includes the information A used to indicate the MAC address aging time. The information A is used to configure MAC address aging time of a device B (that is, an example of a second device) in the EVPN in which the device A is located. The value K is greater than ARP entry aging time of an IP gateway in a layer-3 network. The device B is one or more devices in the EVPN that establish a BGP connection to the device A, that is, the device B is a BGP neighbor device of the device A.

A networking person (which may also be referred to as a network administrator, a networking administrator, an administrator, or the like) may manually input the configuration command for the MAC address aging time to the device A based on a networking status, for example, based on the ARP entry aging time of the gateway device in the layer-3 network connected to the EVPN. The MAC address aging time of the device A is configured, based on the configuration command, to the value K that is greater than the ARP entry aging time of the gateway device in the layer-3 network. Then, the device A sends the packet #1 to notify the device B in the EVPN to reconfigure the MAC address aging time. In this way, MAC address aging time of one device in a layer-2 network is manually modified, and the device sends a packet to indicate another device in the EVPN to modify MAC address aging time, so that MAC address aging time of each device in the EVPN is greater than the ARP entry aging time of the layer-3 gateway device, thereby effectively avoiding sending of an unknown unicast packet in a broadcast form, port congestion, and excessively high CPU usage that are caused because the MAC address aging time is less than the ARP entry aging time, and simplifying network deployment.

Figure 2:
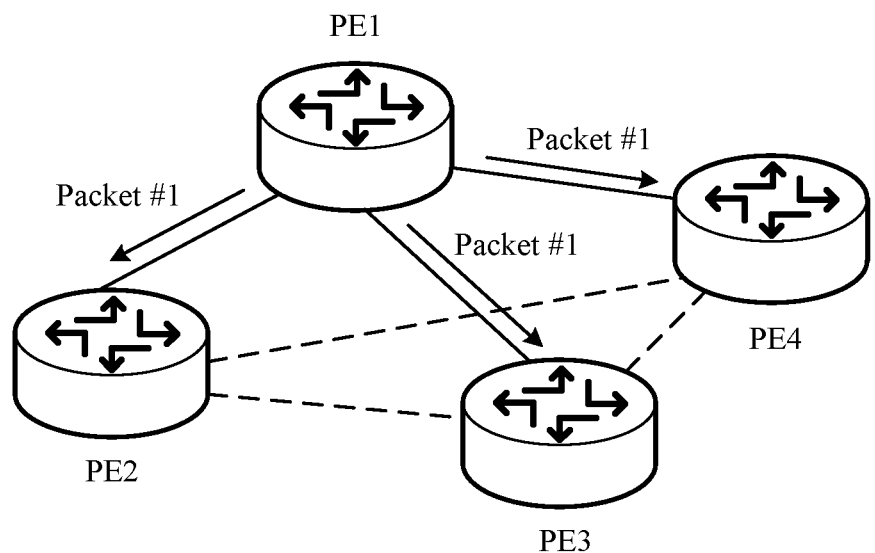
FIG. 2 is a schematic diagram of a method for configuring a MAC address aging time according to an embodiment of the present disclosure.

For example, as shown in FIG. 2, the device A is a PE device PE1 in the EVPN, and the PE1 directly establishes a connection to a PE device in the EVPN. After MAC address aging time of the PE1 is configured to the value K by using the configuration command, the PE1 generates the packet #1 and sends the packet #1 to all PE devices PE2, PE3, and PE4 in the EVPN, that is, the device B in the EVPN is the PE2, the PE3, or the PE4. After receiving the packet #1, the PE2, the PE3, and the PE4 set respective MAC address aging time based on the information A in the packet #1.

Figure 3:
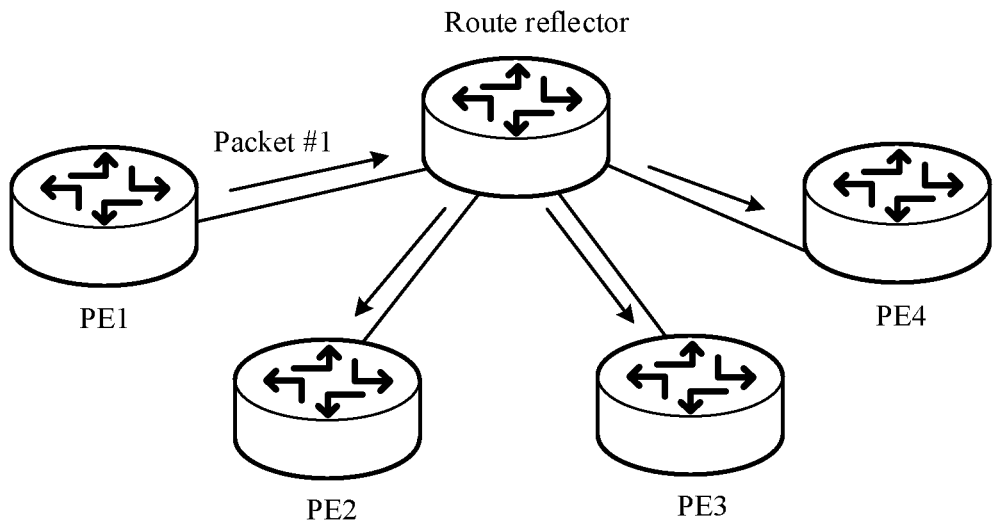
FIG. 3 is another schematic diagram of a method for configuring a MAC address aging time according to an embodiment of the present disclosure.

For another example, as shown in FIG. 3, the device A is a PE1 in the EVPN, and the PE1 establishes a connection relationship with all devices in the EVPN by using a route reflector (RR). In other words, the RR and the PE1 are BGP peers, that is, the RR is a neighbor device of the PE1, and both the RR and the device B (that is, a PE2, a PE3, or a PE4) in the EVPN are BGP neighbor devices. After MAC address aging time of the PE1 is configured to the value K by using the configuration command, the PE1 generates the packet #1 based on the value K and sends the packet #1 to the RR (that is, another example of the second device), and the RR forwards the packet #1 to the neighbor devices PE2, PE3, and PE4. After receiving the packet #1, the PE2, the PE3, and the PE4 set respective MAC address aging time based on the information A in the packet #1.

The device A may be any PE device in the EVPN. By way of example, and not limitation, the device A may be a PE device connected to the layer-3 network in the layer-2 network. In other words, the device A is a PE device at a metro egress in the EVPN.

The MAC address aging time of the device A is reconfigured by using a mac-address aging-time configuration command line. Conditions for generating the packet #1 and sending the packet #1 to a neighbor device by the device A include but are not limited to the following cases:

Case 1: The device A determines, depending on whether the configuration command includes information B, whether to advertise the MAC address aging time to the neighbor device. The information B is used to indicate the device A to advertise the configured MAC address aging time to the neighbor device. When the configuration command does not include the information B, it indicates that the MAC address aging time does not need to be advertised. Therefore, the device A does not generate the packet #1 after the MAC address aging time is modified. When the configuration command includes the information B, it indicates that the MAC address aging time needs to be advertised. Therefore, the device A generates the packet #1 based on the configured MAC address aging time and sends the packet #1 to the neighbor device.

For example, the information B is represented as "advertise mac-aging-time-routes". Using a virtual private network (virtual private network, VPN) instance evpn A as an example, a configuration model may be as follows:

```
evpn vpn-instance evpnA
        route-distinguisher 100:1
        vpn-target 1:1 export-extcommunity
        vpn-target 1:1 import-extcommunity
        mac-address aging-time 100
bgp 100
peer 3.3.3.3 as-number 100
peer 3.3.3.3 as connect-interface LoopBack 0
```

```

    l2vpn-family evpn
    peer 3.3.3.3 enable
    advertise mac-aging-time-routes
```

"mac-address aging-time 100" is for configuring the MAC address aging time to 100 seconds, "peer 3.3.3.3 as-number 100" is used to configure a peer autonomous system (AS) number of a peer 3.3.3.3 to 100, "peer 3.3.3.3 enable" indicates that a BGP function is enabled with a neighbor 3.3.3.3, and "advertise mac-aging-time-routes" indicates to advertise the MAC address aging time to the neighbor device. It should be noted that the foregoing is an example of the configuration model. When the MAC address aging time needs to be advertised, the configuration model includes the information B. Other command lines are merely examples and may or may not be included. This is not limited in the present disclosure.

Case 2: After the device A receives the configuration command for configuring the MAC address aging time, the device A generates the packet #1. In other words, if the MAC address aging time of the device A is reconfigured by using the configuration command, the device A generates the packet #1 and sends the packet #1 to the neighbor device.

Case 3: After the device A receives the configuration command for configuring the MAC address aging time, the device A compares with a value L of a locally configured original MAC address aging time. When the value K is greater than the value L, the device A generates the packet #1 based on the value K, and then sends the packet #1. When the value K is less than the value L, the device A configures the local MAC address aging time to the value K and does not generate a packet.

In the solution of the present disclosure, the packet #1 may be used to transmit the information A in, but not limited to, one of the following forms:

Form 1

Figure 4:
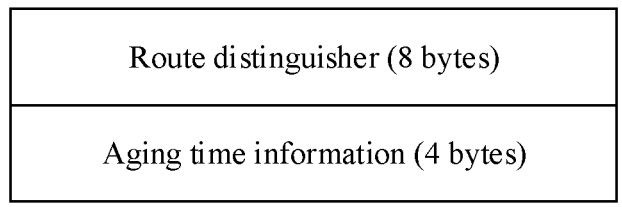
FIG. 4 shows a packet format of a route type A according to an embodiment of the present disclosure.

The packet #1 is a packet of an EVPN route type A. The EVPN route type A is a route type for configuring the MAC address aging time, or the EVPN route type A indicates that the packet #1 is a packet for configuring the MAC address aging time, and the EVPN route type A may be referred to as a MAC address aging time route type. For example, as shown in FIG. 4, a route format may include a route distinguisher (RD) field and an aging time information field. The RD field is of 8 bytes, the aging time information field is used to configure the MAC address aging time, and the aging time information field may include 4 bytes. However, the present disclosure is not limited thereto.

In an implementation, the route type A is a route that is in an EVPN type 1 route (that is, an Ethernet auto-discovery route type) and that is for configuring the MAC address aging time. In the conventional technology, the Ethernet auto-discovery route type includes two types of routes. One route is used for fast convergence (that is, ethernet auto-discovery per ES, EAD/ES), and the other route is used for error identification and path backup (that is, ethernet auto-discovery per EVI, EAD/EVI). Based on the conventional technology, the type A route is a newly added route in the Ethernet auto-discovery route type, that is, the route for configuring the MAC address aging time.

In another implementation, the type A route is a route of a newly numbered EVPN route type, for example, an EVPN route type 6. The EVPN route type 6 is a route type for configuring the MAC address aging time, and the number 6 is merely an example, and there may alternatively be another numbered route type.

According to the foregoing solution, the MAC address aging time is transmitted by using a dedicated route type for configuring the MAC address aging time. This avoids a case in which the MAC address aging time is repeatedly configured by transmitting other information.

Form 2

Figure 5:
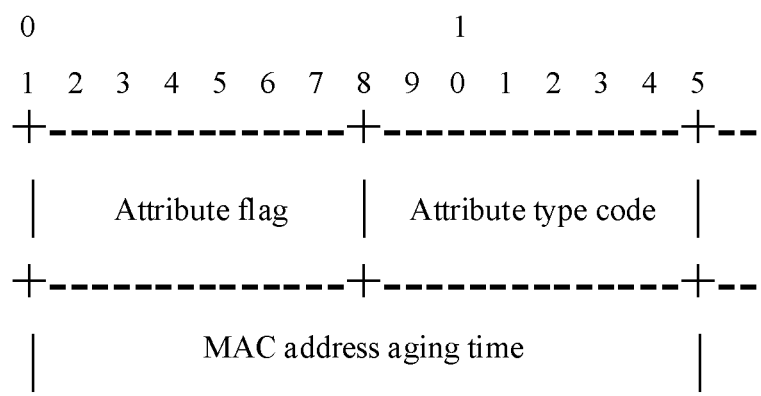
FIG. 5 shows a field format of an attribute A in a packet according to an embodiment of the present disclosure.

An extended community attribute field in the packet #1 includes an attribute A, and the attribute A is used to transmit the information A, that is, the information A for configuring the MAC address aging time is carried in an extended community attribute in the packet #1. Optionally, a route type of the packet #1 is a MAC/IP route type. For example, as shown in FIG. 5, a byte format of the attribute A includes an attribute flag, the attribute flag includes an optionality bit, the optionality bit is used to indicate whether the attribute is an optional attribute or a mandatory attribute, and the attribute flag further includes a transitivity bit. The transitivity bit is used to indicate whether the attribute is transitive. The byte format of the attribute A includes an attribute type code, the attribute type code is used to identify that the attribute is an attribute for configuring the MAC address aging time, and the byte format of the attribute A includes the information A. However, the present disclosure is not limited thereto. For example, the device A sends the packet #1 carrying the attribute A. After receiving the packet #1, the device B determines, if the optionality bit in the attribute flag included in the packet #1 is set to "1", that the attribute is the optional attribute, determines, if the transitivity bit is set to 1, that the attribute is transitive, and then, determines, based on a type number, that the attribute is the attribute for configuring the MAC address aging time. The device B configures the MAC address aging time based on the attribute.

A packet format of an existing route type is reused to transmit the MAC address aging time, so that complexity of a packet format design is reduced.

By way of example, and not limitation, the packet #1 lacks route information for generating a forwarding entry. In other words, the packet #1 does not guide traffic forwarding.

In an implementation, two PE devices that are backups of each other are applied at the metro egress, to avoid service interruption between the layer-2 network and the layer-3 network that is caused by a failure of one of the PE devices. MAC address aging time may be configured on both the devices that are backups of each other. When one of the devices fails, a backup device can also keep the route from being withdrawn to ensure normal service running.

Figure 6:
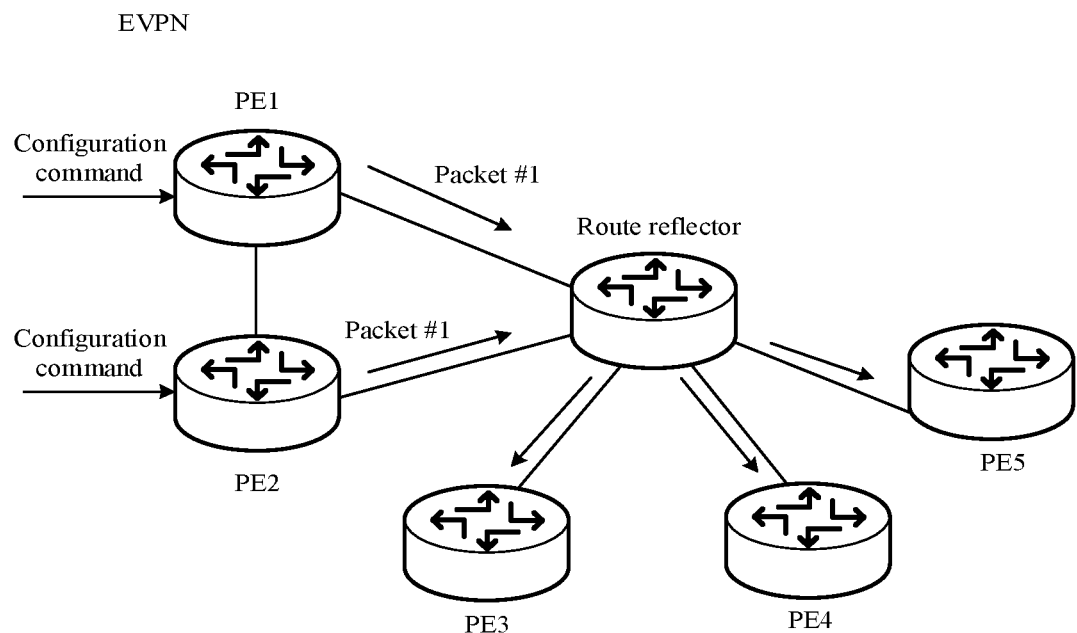
FIG. 6 is another schematic diagram of a method for configuring a MAC address aging time according to an embodiment of the present disclosure.

Optionally, all PE devices in an EVPN shown in FIG. 6 are fully connected by using a route reflector. A PE1 and a PE2 are two PE devices at a metro egress in the EVPN that are backups of each other. After MAC address aging time is manually configured on the PE1 and the PE2 by using a configuration command, one of the device sends a packet #1 to the route reflector or both the devices send packets #1 to the route reflector. Then, the route reflector forwards the packet #1 to a neighbor PE device of the route reflector, so that the MAC address aging time can be reconfigured on all the PE devices in the EVPN.

Figures 7, 8:
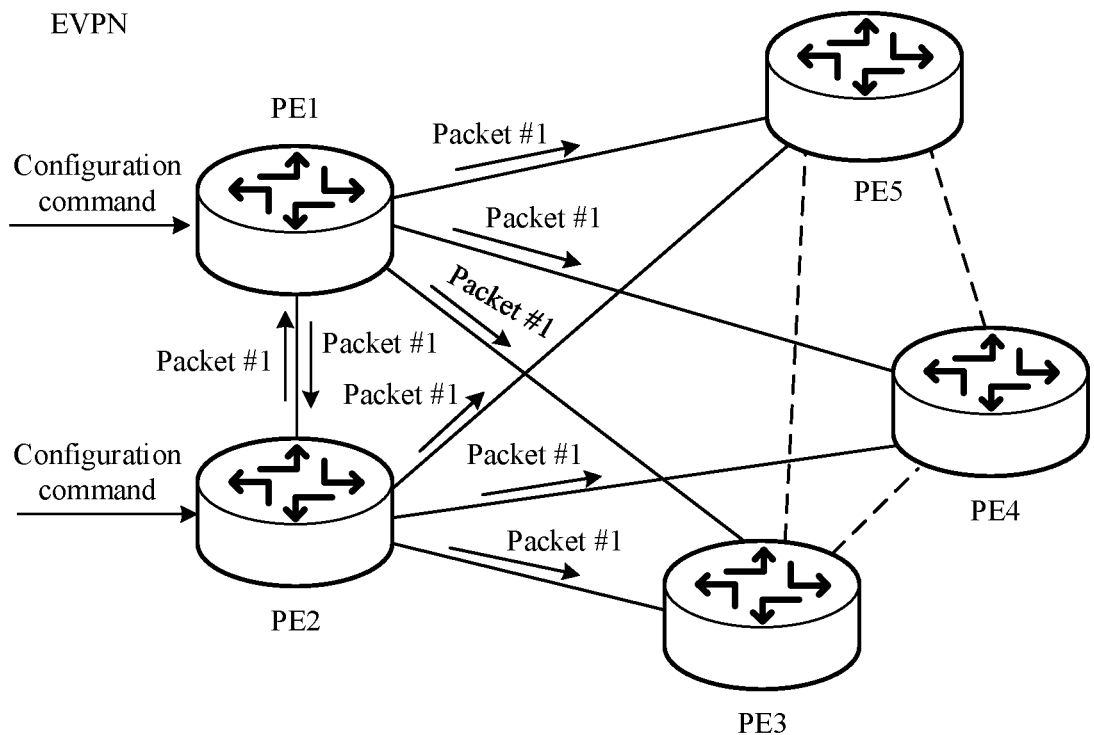
FIG. 7 is another schematic diagram of a method for configuring a MAC address aging time according to an embodiment of the present disclosure.
FIG. 8 is another schematic flowchart of a method for configuring a MAC address aging time according to an embodiment of the present disclosure.

Optionally, PE devices in an EVPN shown in FIG. 7 are fully connected in a manner in which the PE devices in the EVPN are mutually connected. After MAC address aging time is manually configured on two PE devices PE1 and PE2 at a metro egress in the EVPN by using a configuration command, one of the PE1 and the PE2 sends a packet #1 to a connected neighbor device or both the devices send packets #1 to a neighbor device. That is, the PE1 sends the packet #1 to the PE2, a PE3, a PE4, and a PE5, and the PE2 sends the packet #1 to the PE1, the PE3, the PE4, and the PE5, so that the MAC address aging time can be reconfigured on all the PE devices in the EVPN.

On the other hand, after the PE devices in the EVPN are restarted or new PE devices are added to the EVPN, the PE devices can learn the route after establishing a BGP neighbor with an RR.

According to the solution of the present disclosure, MAC address aging time of an individual device in the layer-2 network is manually modified, and then MAC address aging time of another device in the EVPN is configured by using a packet that carries information for configuring the MAC aging time and that is sent by the device, thereby effectively avoiding sending of an unknown unicast packet in a broadcast form, port congestion, and excessively high CPU usage that are caused because the MAC address aging time is less than ARP entry aging time, and simplifying network deployment.

FIG. 8 is another schematic flowchart of a method for configuring a MAC address aging time according to an embodiment of the present disclosure. The method in FIG. 8 is performed by a device B (that is, an example of a second device).

It should be noted that, in this embodiment, for a part that is the same as or similar to that in the embodiment in FIG. 1, refer to the foregoing description of the embodiment in FIG. 1. For brevity, details are not described herein again.

S801. Receive a packet #2, where the packet #2 is an EVPN protocol packet, that is, a BGP packet. The packet #2 includes information A used to indicate MAC address aging time.

The device B receives the packet #2 sent by a device A (that is, an example of a first device), and the packet #2 is the packet #1 in the embodiment in FIG. 1, or the device B receives the packet #2 sent by an RR (that is, another example of the first device), and the packet #2 is the packet #1 that is received by the RR from the device A and that is forwarded by the RR to the device B.

S802. Configure the MAC address aging time based on the information A.

In the present disclosure, content of the information A may include but is not limited to the following forms:

Form 1: The information A is a value K, that is, the information A is a value of the MAC address aging time that is configured by the device A.

In an implementation, after the device B receives the information A, the device B configures the value K as the MAC address aging time.

In another implementation, after the device B receives the information A, the device B compares the value K with a value P of a locally configured MAC address aging time, and uses the larger one of the value K and the value P as the MAC address aging time. When the value K is greater than the value P, the value K is configured as the MAC address aging time. When the value K is less than the value P, the MAC address aging time remains unchanged, that is, the value P.

Form 2: The information A is an offset A.

After the device B receives the information A, the device B configures a sum of the offset A and a value P of a locally configured MAC address aging time as the MAC address aging time.

Optionally, the device A collects the MAC address aging time of the device B in the VPN, determines the offset A based on a value K and the MAC address aging time of the device B, and then generates a BGP packet. For example, the device A determines the offset A based on the MAC address aging time of the device B in the VPN, so that a sum of the MAC address aging time of the device B and the offset A is greater than the value K.

Form 3: The information A is an index value. The index value corresponds to a value Q of the MAC address aging time.

The device B determines, based on the index value, a value Q corresponding to the index value, and then configures the MAC address aging time based on the value Q. During delivery, the device B stores an index table for configuring the MAC address aging time. However, the present disclosure is not limited thereto.

In an implementation, the value Q is an optional value of the MAC address aging time, and the device B configures the value Q or the larger one of the value Q and a value P of local MAC address aging time as the MAC address aging time.

In another implementation, the value Q is an offset, and the device B configures a sum of the offset Q and a value P of a locally configured MAC address aging time as the MAC address aging time.

It should be noted that a part or all of the embodiment in FIG. 2 and the embodiment in FIG. 8 may be implemented independently, or may be implemented in combination with each other to implement the described functions. It should not be considered that the implementation goes beyond the scope of the present disclosure.

Figure 9:
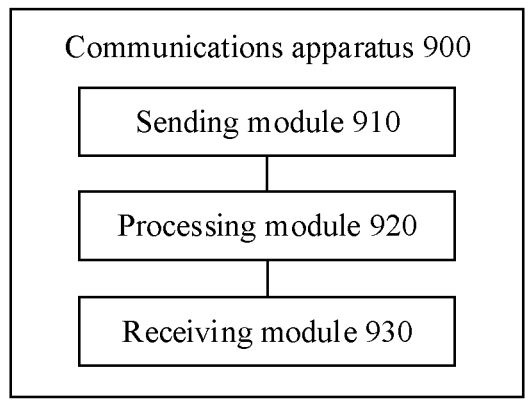
FIG. 9 is a schematic block diagram of a communications apparatus according to an embodiment of the present disclosure.

FIG. 9 is a schematic block diagram of a communications apparatus 900 according to an embodiment of the present disclosure. It should be understood that the communications apparatus 900 is merely an example. The communications apparatus provided in this embodiment of the present disclosure may further include other modules or units, may include modules having functions similar to those of modules in FIG. 9, or may not necessarily include all modules in FIG. 9.

In an implementation, the apparatus is applied in a device A, and the apparatus includes a processing module 920 configured to generate a first Ethernet virtual private network EVPN protocol packet, where the first EVPN protocol packet includes aging time information indicating aging time of a MAC address for an EVPN; and a sending module 910 configured to send the first EVPN protocol packet to a device B or an RR.

In a possible design, the first EVPN protocol packet lacks route information for generating a forwarding entry.

In a possible design, a route type of the first EVPN protocol packet indicates that the first EVPN protocol packet is a packet for configuring the MAC address aging time.

In a possible design, a route type of the first EVPN protocol packet is a MAC/IP route, and the aging time information is carried in an extended community attribute field of the first EVPN protocol packet.

In a possible design, the device B or the RR is a BGP neighbor device of a first device.

In a possible design, the device A is a layer-2 network egress provider edge PE device.

In another implementation, the apparatus is applied in a device B, and the apparatus includes: a receiving module 930 configured to receive a second Ethernet virtual private network EVPN protocol packet sent by a device A or an RR, where the second EVPN protocol packet includes aging time information indicating aging time of a media access control MAC address for an EVPN; and a processing module 920 configured to configure MAC address aging time based on the aging time information.

In a possible design, the second EVPN protocol packet lacks route information for generating a forwarding entry.

In a possible design, the aging time information is a first value of the MAC address aging time; and that the device B configures the MAC address aging time based on the aging time information includes the device B configures the first value as the MAC address aging time, or the device B uses the larger one of the first value and a second value of a locally configured MAC address aging time as the MAC address aging time.

In a possible design, a route type of the second EVPN protocol packet indicates that the second EVPN protocol packet is a packet for configuring the MAC address aging time.

In a possible design, a route type of the second EVPN protocol packet is a MAC/IP route, and the aging time information is carried in an extended community attribute field of the second EVPN protocol packet.

In a possible design, a second device is a BGP neighbor device of the device A or the RR.

Figure 10:
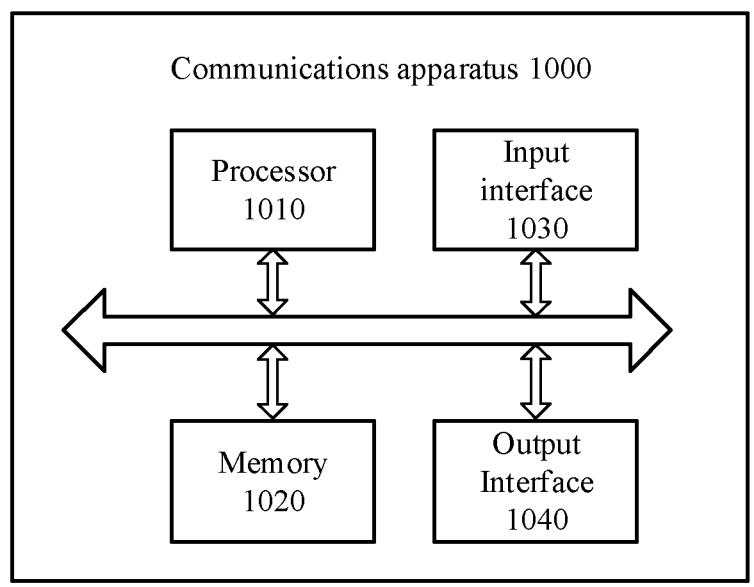
FIG. 10 is a schematic diagram of a hardware structure of a communications apparatus according to an embodiment of the present disclosure.

FIG. 10 is a schematic structural diagram of a communications apparatus 1000 according to an embodiment of the present disclosure. It should be understood that the communications apparatus 1000 shown in FIG. 10 is merely an example. The communications apparatus in this embodiment of the present disclosure may further include other modules or units, or may include modules having functions similar to those of modules in FIG. 10.

The communications apparatus 1000 may include one or more processors 1010, one or more memories 1020, and an input interface 1030. The apparatus 1000 may further include an output interface 1040. In a possible design, the input interface 1030 and the output interface 1040 may be integrated together, and are referred to as a transceiver interface. The memory 1020 is configured to store program code to be executed by the processor 1010. The processor 1010 may be integrated with the memory 1020, or the processor 1010 is coupled to the one or more memories 1020, and is configured to invoke instructions in the memory 1020.

In an embodiment, the processor 1010 may be configured to implement operations or steps that can be implemented by the processing module 920 in FIG. 9, and the input interface 1030 may be configured to implement operations or steps that can be implemented by the receiving module 930 in FIG. 9. The output interface 1040 may be configured to implement operations or steps that can be implemented by the sending module 910 in FIG. 9.

It should be understood that, the processor in this embodiment of the present disclosure may be a CPU. The processor may alternatively be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be further understood that the memory in this embodiment of the present disclosure may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM) that is used as an external cache. By way of example, and not limitative descriptions, RAMs in many forms may be used, for example, a static RAM (SRAM), a dynamic RAM (DRAM), a synchronous dynamic RAM (SDRAM), a double data rate synchronous dynamic RAM (DDR SDRAM), an enhanced synchronous dynamic RAM (ESDRAM), a synchlink dynamic RAM (SLDRAM), and a direct Rambus RAM (DR RAM).

All or some of the foregoing embodiments may be implemented by software, hardware, firmware, or any combination thereof. When software is used to implement the embodiments, the foregoing embodiments may be implemented completely or partially in a form of a computer program product. The computer program product includes one or more computer instructions or computer programs. When the computer instructions or the computer programs are loaded and executed on a computer, the procedures or functions according to the embodiments of the present disclosure are all and partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disc or digital versatile disc (DVD)), or a semiconductor medium. The semiconductor medium may be a solid-state drive.

It should be understood that the term "and/or" in the specification describes only an association relationship for describing associated objects and represents that three relationships may exist. For example, A and/or B may represent the following three cases: Only A exists, both A and B exist, and only B exists. In addition, the character "/" in the specification generally indicates an "or" relationship between the associated objects.

It should be understood that sequence numbers of the foregoing processes do not mean execution sequences in the embodiments of the present disclosure. The execution sequences of the processes should be determined based on functions and internal logic of the processes, and should not be construed as any limitation on the implementation processes of the embodiments of the present disclosure.

A person of ordinary skill in the art may be aware that, in combination with the examples described in the embodiments disclosed in the specification, units and algorithm steps may be implemented by electronic hardware or a combination of computer software and electronic hardware. Whether the functions are performed by hardware or software depends on particular present disclosures and design constraints of the technical solutions. A person skilled in the art may use different methods to implement the described functions of each particular present disclosure, but it should not be considered that the implementation goes beyond the scope of the present disclosure.

A person skilled in the art may clearly understand that, for the purpose of convenient and brief description, for detailed working processes of the foregoing system, apparatuses, and units, refer to corresponding processes in the foregoing method embodiments. Details are not described herein again.

In the several embodiments provided in the present disclosure, it should be understood that the disclosed systems, apparatuses, and methods may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or the units may be implemented in electronic, mechanical, or other forms.

The units described as separate parts may or may not be physically separate, and parts displayed as units may or may not be physical units, and may be located at one location, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of the present disclosure essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of the present disclosure. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A second device comprising:
   a memory configured to store instructions; and
   a processor coupled to the memory and configured to execute the instructions to enable the second device to:
      receive an Ethernet virtual private network (EVPN) protocol packet from a first device, wherein the EVPN protocol packet comprises aging time information indicating a first media access control (MAC) address aging time of the first device for an EVPN;
      compare the first MAC address aging time to a locally configured MAC address aging time;
      maintain the locally configured MAC address aging time when the first MAC address aging time is less than the locally configured MAC address aging time; and
      configure the locally configured MAC address aging time to the first MAC address aging time when the first MAC address aging time is greater than the locally configured MAC address aging time.

2. The second device according to claim 1, wherein the EVPN protocol packet lacks route information for generating a forwarding entry.

3. The second device according to claim 1, wherein a route type of the EVPN protocol packet indicates that the EVPN protocol packet is for configuring the MAC address aging time, and wherein the route type is a route in an EVPN type 1 route.

4. The second device according to claim 1, wherein the aging time information is carried in an extended community attribute field in the EVPN protocol packet.

5. The second device according to claim 1, wherein a route type of the EVPN protocol packet indicates that the EVPN protocol packet is for configuring the MAC address aging time.

6. The second device according to claim 1, wherein a route type of the EVPN protocol packet is a MAC/Internet Protocol (IP) route type, and wherein the aging time information is carried in an extended community attribute field of the EVPN protocol packet.

7. The second device according to claim 1, wherein the second device is a Border Gateway Protocol (BGP) neighbor device of the first device.

8. A method comprising:
   receiving an Ethernet virtual private network (EVPN) protocol packet from a first device, wherein the EVPN protocol packet comprises aging time information indicating a first media access control (MAC) address aging time of the first device for an EVPN;
   comparing the first MAC address aging time to a locally configured MAC address aging time;
   maintaining the locally configured MAC address aging time when the first MAC address aging time is less than the locally configured MAC address aging time; and
   configuring the locally configured MAC address aging time to the first MAC address aging time when the first MAC address aging time is greater than the locally configured MAC address aging time.

9. The method according to claim 8, wherein the EVPN protocol packet lacks route information for generating a forwarding entry.

10. The method according to claim 8, wherein a route type of the EVPN protocol packet indicates that the EVPN protocol packet is for configuring the MAC address aging time, and wherein the route type is a route in an EVPN type 1 route.

11. The method according to claim 8, wherein the aging time information is carried in an extended community attribute field in the EVPN protocol packet.

12. The method according to claim 8, wherein a route type of the EVPN protocol packet indicates that the EVPN protocol packet is for configuring the MAC address aging time.

13. The method according to claim 8, wherein a route type of the EVPN protocol packet is a MAC/Internet Protocol (IP) route type, and wherein the aging time information is carried in an extended community attribute field of the EVPN protocol packet.

14. The method according to claim 8, wherein the first device is a Border Gateway Protocol (BGP) neighbor device.

15. A computer program product comprising computer-executable instructions stored on a non-transitory computer-readable storage medium, the computer-executable instructions when executed by one or more processors of an apparatus, cause the apparatus to:
receive an Ethernet virtual private network (EVPN) protocol packet from a first device, wherein the EVPN protocol packet comprises aging time information indicating a first media access control (MAC) address aging time of the first device for an EVPN;
compare the first MAC address aging time to a locally configured MAC address aging time;
maintain the locally configured MAC address aging time when the first MAC address aging time is less than the locally configured MAC address aging time; and
configure the locally configured MAC address aging time to the first MAC address aging time when the first MAC address aging time is greater than the locally configured MAC address aging time.

16. The computer program product according to claim 15, wherein the EVPN protocol packet lacks route information for generating a forwarding entry.

17. The computer program product according to claim 15, wherein a route type of the EVPN protocol packet indicates that the EVPN protocol packet is for configuring the MAC address aging time, and wherein the route type is a route in an EVPN type 1 route.

18. The computer program product according to claim 15, wherein the aging time information is carried in an extended community attribute field in the EVPN protocol packet.

19. The computer program product according to claim 15, wherein a route type of the EVPN protocol packet indicates that the EVPN protocol packet is for configuring the MAC address aging time.

20. The computer program product according to claim 15, wherein a route type of the EVPN protocol packet is a MAC/Internet Protocol (IP) route type, and wherein the aging time information is carried in an extended community attribute field of the EVPN protocol packet.

\* \* \* \* \*